United States Patent
Alig et al.

(10) Patent No.: US 7,329,711 B2
(45) Date of Patent: Feb. 12, 2008

(54) MODIFIED EPOXY RESINS

(75) Inventors: Ingo Alig, Weiterstadt (DE); Marco Holst, Stuttgart (DE); Martin Weber, Maikammer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 422 days.

(21) Appl. No.: 10/495,279

(22) PCT Filed: Oct. 29, 2002

(86) PCT No.: PCT/EP02/12045

§ 371 (c)(1),
(2), (4) Date: May 11, 2004

(87) PCT Pub. No.: WO03/042298

PCT Pub. Date: May 22, 2003

(65) Prior Publication Data

US 2005/0038170 A1    Feb. 17, 2005

(30) Foreign Application Priority Data

Oct. 29, 2002 (DE) ................. 101 55 157

(51) Int. Cl.
*C08J 5/00* (2006.01)
*C08K 3/34* (2006.01)
*C08L 63/00* (2006.01)
*C08L 63/02* (2006.01)

(52) U.S. Cl. ............ 525/533; 264/331.12; 525/523; 525/468; 523/466; 523/468

(58) Field of Classification Search ........... None
See application file for complete search history.

(56) References Cited

U.S. PATENT DOCUMENTS

| | | | |
|---|---|---|---|
| 4,656,207 A * | 4/1987 | Jabloner et al. | 523/400 |
| 5,026,789 A * | 6/1991 | Weber et al. | 525/423 |
| 5,034,473 A | 7/1991 | Schultz et al. | |
| 5,457,169 A * | 10/1995 | Weber et al. | 525/534 |
| 5,998,533 A * | 12/1999 | Weber et al. | 524/540 |
| 7,105,591 B2 * | 9/2006 | Weber et al. | 524/413 |

FOREIGN PATENT DOCUMENTS

| | | |
|---|---|---|
| EP | 362 348 | 10/1990 |
| EP | 506 611 | 9/1992 |
| WO | WO 9910432 A1 * | 3/1999 |

OTHER PUBLICATIONS

Derwent accession No. 1986-233709 for EP 193,082 A and US 4,656,207, Jabloner et al., Sep. 3, 1986, one page.*

* cited by examiner

*Primary Examiner*—Robert Sellers
(74) *Attorney, Agent, or Firm*—Novak Druce & Quigg, LLP

(57) ABSTRACT

The present invention relates to molding compositions comprising
A) from 40 to 99% by weight of at least one epoxy resin,
B) from 1 to 60% by weight of at least one polyarylene ether sulfone containing side- or end-groups selected from the group consisting of carboxy groups and anhydride groups,
C) from 0 to 60% by weight of at least one polyarylene ether sulfone containing essentially no side- or end-groups selected from the group consisting of carboxy and anhydride groups,
D) from 0 to 60% by weight of at least one filler, and
E) from 0 to 40% by weight of one or more various additives,
where the percentages by weight of components A to E together give 100%,
and also to a process for preparing these molding compositions, and to their use, and to moldings obtainable therefrom.

9 Claims, No Drawings

MODIFIED EPOXY RESINS

The present invention relates to molding compositions which comprise

A) from 40 to 99% by weight of at least one epoxy resin,
B) from 1 to 60% by weight of at least one polyarylene ether sulfone containing side or end groups selected from the group consisting of carboxy groups and anhydride groups,
C) from 0 to 60% by weight of at least one polyarylene ether sulfone containing essentially no side or end groups selected from the group consisting of carboxy and anhydride groups,
D) from 0 to 60% by weight of at least one filler, and
E) from 0 to 40% by weight of one or more various additives, where the percentages by weight of components A to E together give 100%.

The present invention further relates to a process for preparing these molding compositions, to the use of these molding compositions for producing moldings, and also to moldings made from the molding compositions of the invention.

Molding compositions based on epoxy resins are well known and are thermoset materials which are widely used, for example in electrical engineering, automotive engineering, and also in the construction industry.

Epoxy resin systems generally have very high hardness and stiffness, and also good heat resistance, chemicals resistance, weathering resistance, and heat distortion resistance. However, disadvantages of these systems are that volume shrinkage often occurs during hardening, and the hardened products lack toughness and extensibility.

A wide variety of additives for epoxy resin systems has been described with the aim of ameliorating these disadvantageous properties. For example, EP-A2 392 348 discloses epoxy resin systems comprising an epoxy resin, a hardener, and particulate thermoplastics, inter alia polysulfones, these having improved toughness, in particular improved impact strength.

EP-A2 373 440 describes toughened epoxy resin mixtures made from an aromatic epoxy compound, an amine hardener, an aromatic thermoplastic oligomer containing reactive groups, preferably an amine-terminated polysulfone or polyether sulfone, and also a high-molecular-weight emulsifier whose morphology is independent of the hardening temperature and of the nature of the heating cycle, the result on hardening being moldings with uniformly good mechanical properties, with no variation in the product.

However, incompatibility between the epoxy resin and polysulfone or polyether sulfone makes the epoxy resin systems obtainable as in EP-A2 392 348 or EP-A2 373 440 opaque and therefore not very suitable for many applications.

It is an object of the present invention to provide epoxy resins which are polyarylene-ether-sulfone modified and have better transparency than known epoxy resin systems together with comparably good or improved mechanical properties, for example comparably good or improved impact strength.

We have found that this object is achieved by means of the molding compositions defined at the outset and described in more detail below.

Component A

The molding compositions of the invention comprise, based on the total weight of A to E, from 40 to 99% by weight, in particular from 55 to 95% by weight, and particularly preferably from 60 to 90% by weight, of component A.

In principle, any epoxy resin is suitable as component A of the molding compositions of the invention. Epoxy resins, and also processes for preparing epoxy resins, are known to the skilled worker (see, for example, F. Lohse, W. Seitz in E. Müller (Eds.) Houben-Weyl, Methoden der organischen Chemie, Makromolekulare Stoffe III, Georg Thieme Verlag, Stuttgart 1961, or G. Becker, D. Braun (Eds.) Duroplaste, Kunststoff-Handbuch 10, Carl Hanser Verlag, Munich, Vienna, 1988). Epoxy resins can usually be obtained from epoxy compounds a1) which are generally organic and low-molecular-weight or oligomeric and have more than one epoxy group per molecule, by a polyaddition reaction with one or more suitable hardeners a2) and/or accelerators a3), but epoxy resins can also be obtained without hardener and/or accelerator via polymerization of the epoxy compounds. For the purposes of the present invention the term "accelerator" includes any substance which may be used specifically for influencing the hardening process, for example accelerating the hardening process.

Particularly suitable epoxy compounds a1) known to the skilled worker are based on reaction products of polyfunctional alcohols, phenols, cycloaliphatic carboxylic acids, aromatic amines, or aminophenols with epichlorohydrin, or else cycloaliphatic epoxides or cycloaliphatic epoxyesters. It is also possible to use a mixture of various epoxy compounds. Preference is given to bisphenol A diglycidyl ether, bisphenol F diglycidyl ether, resorcinol diglycidyl ether, and triglycidyl ethers of para-aminophenols, and also to mixtures of these epoxy compounds. Other particularly suitable epoxy compounds a1) known to the skilled worker are reaction products of epichlorohydrin with o-cresol and, respectively, phenol novolaks. Very particular preference is given to epoxy compounds a1) based on bisphenol A. The glass transition temperature of the epoxy compounds a1) is preferably below 20° C. Their average molecular weight is generally below 2 000 g/mol, preferably below 1 500 g/mol.

Examples of compounds which may be used as hardener a2) are anhydrides, phenol-containing compounds, amines, and other substances known to the skilled worker as hardeners. Suitable hardeners a2) are described by way of example in EP-A2 373 440.

Examples of accelerators a3) which may be used are tertiary amines, organophosphines, Lewis bases, Lewis acids, and other substances known to the skilled worker as accelerators.

Other suitable hardeners a2) and accelerators a3) are described by way of example in H. Lee, K. Neville, Handbook of Epoxy Resins, McGraw-Hill Book Company, New York, San Francisco, Toronto, 1967.

Component C

The molding compositions of the invention comprise, based on the total weight of A to E, from 0 to 60% by weight, in particular from 0 to 55% by weight, and particularly preferably from 0 to 50% by weight, of component C.

According to the invention, the component C used comprises a polyarylene ether sulfone which has essentially no side or end groups selected from the group consisting of carboxy and anhydride groups. Preferred polyarylene ether sulfones C contain from 99 to 100 mol %, preferably from 99.5 to 100 mol %, of side or end groups which are not carboxy or anhydride groups, for example chloride end groups or methoxy end groups, these mol % values being based on the entirety of all side and end groups. Polyarylene ether sulfones C are known and are marketed by the company Solvay with the trademarks Udel® and Radel®, and by BASF Aktiengesellschaft with the trademarks Ultrason® S and Ultrason® E, for example. It is also possible to use mixtures made from two or more different polyarylene ether sulfones as component C.

The arylene groups of the polyarylene ether sulfones C may be identical or different and, independently of one another, may be aromatic radicals having from 6 to 18 carbon atoms. Examples of suitable arylene radicals are phenylene, biphenylene, terphenylene, 1,5-naphthylene, 1,6-naphthylene, 1,5-anthrylene, 9,10-anthrylene, and 2,6-anthrylene. Among these, preference is given to 1,4-phenylene and 4,4'-biphenylene. These aromatic radicals are preferably unsubstituted. However, they may bear one or more substituents. Examples of suitable substituents are alkyl, arylalkyl, aryl, nitro, cyano, and alkoxy groups, and also heteroaromatic systems, such as pyridine, and halogen atoms. Preferred substituents include alkyl radicals having up to 10 carbon atoms, such as methyl, ethyl, isopropyl, n-hexyl, isohexyl, $C_1$-$C_{10}$-alkoxy radicals, such as methoxy, ethoxy, n-propoxy, n-butoxy, aryl radicals having up to 20 carbon atoms such as phenyl or naphthyl, and also fluorine and chlorine.

Other preferred substituents are those which can be obtained by reacting the polyarylene ether sulfones with a reactive compound which besides a double or triple carbon-carbon bond has one or more carbonyl, amino, hydroxyl, epoxy, oxazoline, urethane, urea, lactam, or halobenzyl groups. The linkage of the arylene groups to one another in the polyarylene ether sulfones may be via —O—, —S—, —SO—, —CO—, —N=N—, —COO—, an alkylene radical which may have substitution if desired, or a chemical bond, as well as by —$SO_2$—.

Preferred polyarylene ether sulfones (component C) which may be used according to the invention are composed of repeat units of the formula I

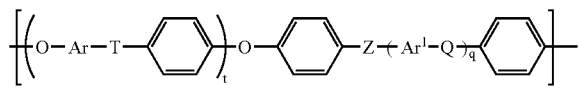

(I)

where t and q, independently of one another, are 0, 1, 2 or 3, each of Q, T, and Z, independently of one another, is a chemical bond or a group selected from the class consisting of —O—, —S—, —$SO_2$—, S=O, C=O, —N=N—, —$R^aC$=$CR^b$— and —$CR^cR^d$—, where each of $R^a$ and $R^b$, independently of one another, is a hydrogen atom or a $C_1$-$C_{12}$-alkyl group, and each of $R^c$ and $R^d$, independently of one another, is a hydrogen atom or a $C_1$-$C_{12}$-alkyl, $C_1$-$C_{12}$-alkoxy, or $C_6$-$C_{18}$-aryl group, where if $R^c$ and $R^d$ are an alkyl, alkoxy, or aryl group, they may, independently of one another, have substitution by fluorine and/or chlorine atoms, and where $R^c$ and $R^d$ together with the carbon atom to which they are bonded may form a $C_3$-$C_{12}$-cycloalkyl group which may have substitution by one or more $C_1$-$C_6$-alkyl groups, with the proviso that at least one of the groups T, Q and Z is —$SO_2$—, and, if t and q are 0, Z is —$SO_2$—, each of Ar and $Ar^1$, independently of one another, is a $C_6$-$C_{18}$-arylene group, which may have substitution by $C_1$-$C_{12}$-alkyl, $C_6$-$C_{18}$-aryl, or $C_1$-$C_{12}$-alkoxy groups or by halogen atoms.

It is also possible for various units of the formula I to be present with random or block distribution in the polyarylene ether sulfone.

The polyarylene ether sulfones C are preferably linear. However, the polyarylene ether sulfones C may also have chain-branching units which are formed via incorporation of compounds having three or more functional groups capable of substitution under the conditions of synthesis of the polyarylene ether sulfones.

An example of the method of preparing polyarylene ethers C which can be used according to the invention is condensation of aromatic bishalogen compounds and the double alkali metal salts of aromatic bisphenols, for example by analogy with GB 1 152 035 and U.S. Pat. No. 4,870,153, expressly incorporated herein by way of reference. Suitable process conditions for the synthesis of polyarylene ether sulfones are given by way of example in EP-A- 0 113 112 and EP-A- 0 135 130. A very particularly suitable method is the reaction of the monomers in aprotic polar solvents in the presence of anhydrous alkali metal carbonate. One particularly preferred combination is N-methylpyrrolidone as solvent and potassium carbonate as catalyst. The reaction in the melt is also preferred. Examples of suitable polyarylene ether sulfones C are those having at least one of the following structural repeat units $I_1$ to $I_{15}$:

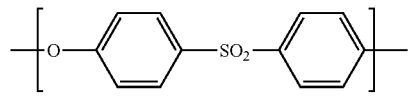

(I1)

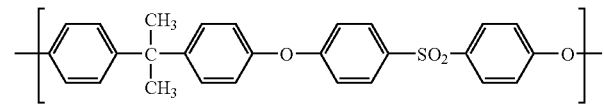

(I2)

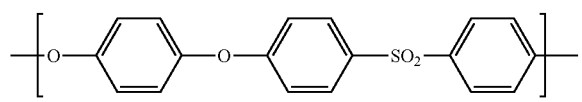

(I3)

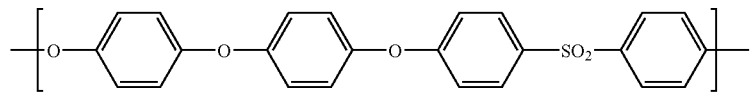

(I4)

-continued
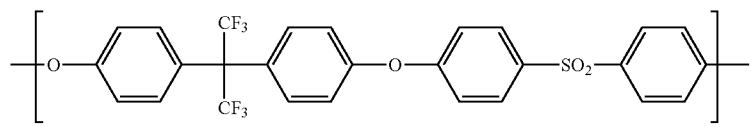 (I5)
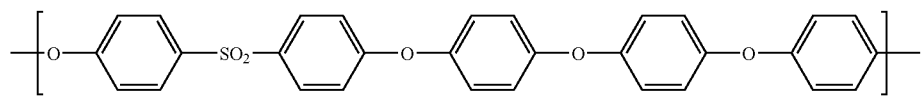 (I6)
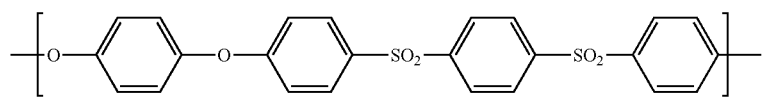 (I7)
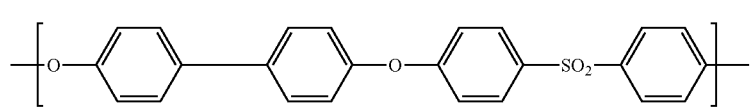 (I8)
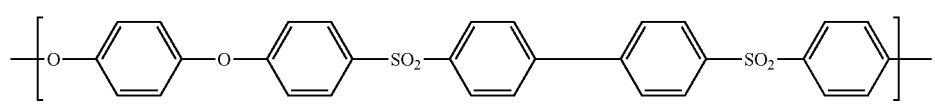 (I9)
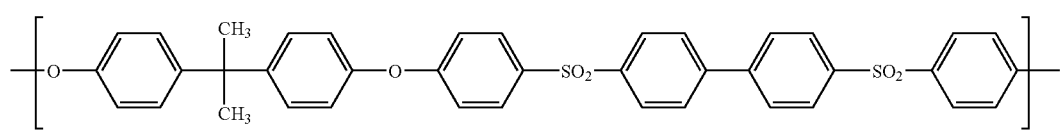 (I10)
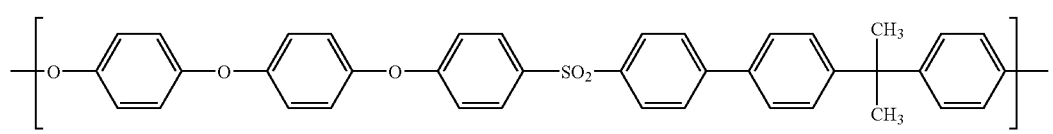 (I11)
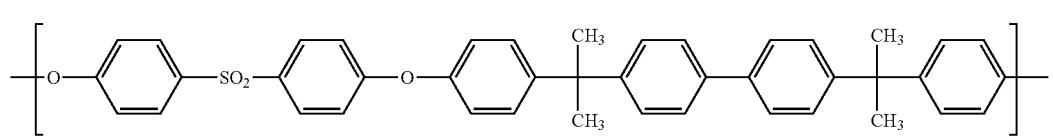 (I12)
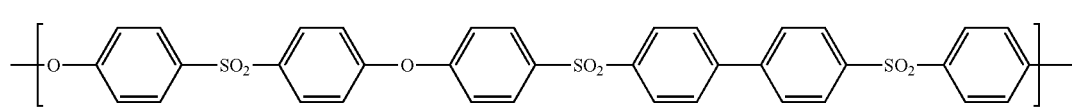 (I13)
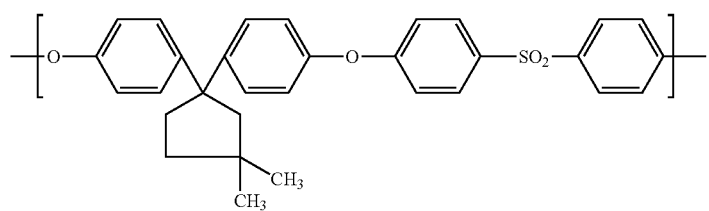 (I14)
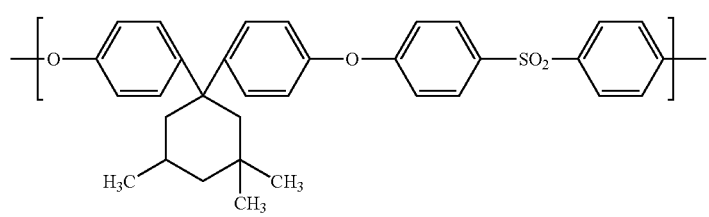 (I15)

Particularly preferred units of the formula I which may be mentioned are units of the formulae $I_1$ and $I_2$, which may be used individually or in a mixture.

Depending on the synthesis conditions, the polyarylene ether sulfones may have various functional groups. These functional groups may have bonding to atoms of the polymer chain or be present as polymer chain end groups.

These functional groups include halo, in particular chloro, alkoxy, especially methoxy or ethoxy, and aryloxy, preferably phenoxy or benzyloxy groups. Other examples of these functional groups which may be mentioned are hydroxy, amino, and epoxy groups. Among these, particular preference is given to polyarylene ether sulfones having amino or epoxy end groups, or mixtures of these.

The preparation of polyarylene ether sulfones C containing functional groups has been described in DE-A1 199 61 040 and in the references mentioned therein.

The polyarylene ether sulfones C may also be copolymers or block copolymers where polyarylene ether sulfone segments are present with segments of other thermoplastic polymers, such as polyesters, aromatic polycarbonates, polyester carbonates, polysiloxanes, polyimides, or polyetherimides. The molar masses (number-average) of the blocks or of the graft branches in the copolymers are generally in the range from 1 000 to 30 000 g/mol. The arrangement of the blocks of different structure may be alternating or random. The proportion by weight of the polyarylene ether sulfones in the copolymers or block copolymers is generally at least 10% by weight. The proportion by weight of the polyarylene ether sulfones may be up to 97% by weight. Preference is given to copolymers or block copolymers having a proportion by weight of polyarylene ether sulfones of up to 90%. Particular preference is given to copolymers or block copolymers having from 20 to 80% by weight of polyarylene ether sulfones.

The polyarylene ether sulfones C generally have average molar masses $M_n$ (number-average) in the range from 3 000 to 60 000 g/mol and relative viscosities of from 0.15 to 0.95 dl/g. Depending on the solubility of the polyarylene ether sulfones, the relative viscosities are measured either in 1% strength by weight N-methylpyrrolidone solution, in a mixture of phenol and dichlorobenzene, or in 96% strength sulfuric acid, in each case at 20 or 25° C.

Component B

The molding compositions of the invention comprise, based on the total weight of A to E, from 1 to 60% by weight, in particular from 5 to 45% by weight, particularly preferably from 10 to 40% by weight, of component B.

According to the invention, the component B used comprises a polyarylene ether sulfone which contains side or end groups selected from the group consisting of carboxy and anhydride groups. It is also possible to use mixtures made from two or more different polyarylene ether sulfones B. These polyarylene ether sulfones B are known to the skilled worker and may be prepared by processes known to the skilled worker.

The polyarylene ether sulfones B are similarly composed of the repeat units described above under the description of component C, but unlike in component C these repeat units also contain, based on the total weight of component B, from 0.1 to 15% by weight, preferably from 0.2 to 12.5% by weight, particularly preferably from 0.25 to 10% by weight, of side or end groups selected from the group consisting of carboxy and anhydride groups.

Preferred polyarylene ether sulfones B contain from 0 to 100 mol % of repeat units I1 and from 0 to 100 mol % of repeat units I2, where the molar percentages of repeat units of the formulae I1 and I2 together give 100 mol %, and where the units I1 and I2 also contain, based on the total weight of component B, from 0.1 to 15% by weight, preferably from 0.2 to 12.5% by weight, particularly preferably from 0.25 to 10% by weight, of side or end groups selected from the group consisting of carboxy and anhydride groups.

The polyarylene ether sulfones B particularly preferably contain anhydride end groups.

The processes for preparing the polyarylene ether sulfones B are known and may be carried out in a manner similar to that for the processes for preparing component C, for example, but the carboxy or anhydride groups are introduced in one or more additional or modified stages of the synthesis (see, for example, DE 10149870.5 (file reference)). The preparation of polyarylene ether sulfones B having anhydride end groups is described by way of example in WO 97/04018, EP-A 613 916 or C. L. Myers, ANTEC '92, 1992, 1, 1420. The preparation of polyarylene ether sulfones B having lateral anhydride groups is described by way of example in EP-A 513 488. The preparation of polyarylene ether sulfones B aving lateral carboxy groups is described by way of example in WO 99/10432, I. W. Parsons et. al., Polymer 34, 2836 (1993), and also by T. Koch, H. Ritter, Macromol. Phys. 195, 1709 (1994).

The proportion of carboxy or anhydride groups in the polyarylene ether sulfone B may be determined by the known methods of general organic analysis, such as titration, IR spectroscopy, UV spectroscopy, and NMR spectroscopy.

Component D

The molding compositions of the invention may, if desired, comprise from 0 to 60% by weight of fillers or reinforcing agents known to the skilled worker. The molding compositions of the invention preferably comprise from 0 to 50% by weight, in particular from 0 to 40% by weight, of fibrous or particulate fillers or reinforcing materials, or a mixture of these. The amounts given are in each case based on the total weight of components A to E.

Preferred fibrous fillers or fibrous reinforcing materials are carbon fibers, potassium titanate whiskers, aramid fibers, and, particularly preferred, glass fibers. If glass fibers are used, they may have been provided with a size, preferably with a polyurethane size, and with a coupling agent, to improve compatibility with the matrix material. The diameter of the carbon fibers and glass fibers used is generally in the range from 6 to 20 μm.

The glass fibers incorporated may either be short glass fibers or else continuous strands (rovings). The average length of the glass fibers in the finished molding is generally in the range from 0.08 to 0.5 mm.

The carbon fibers or glass fibers used may also be in the form of fabrics, mats, or glass silk rovings.

Suitable particulate fillers are amorphous silica, carbonates, such as magnesium carbonate or chalk, powdered quartz, mica, various silicates, such as clays, muscovite, biotite, suzoite, tin maletite, talc, chlorite, phlogophite, feldspar, or calcium silicates, such as wollastonite, or aluminum silicates, such as kaolin, particularly calcined kaolin.

In one particularly preferred embodiment, use is made of particulate fillers at least 95% by weight of whose particles, preferably at least 98% by weight of whose particles, have a diameter (greatest dimension), determined on the finished product, of less than 45 µm, preferably less than 40 µm, and whose "aspect ratio" is in the range from 1 to 25, preferably in the range from 2 to 20, determined on the finished product.

One way of determining the particle diameters here is to take electron micrographs of thin layers of the polymer mixture and make the evaluation by using at least 25, preferably at least 50, filler particles. The particle diameters may also be determined by sedimentation analysis, as in Transactions of ASAE, p. 491 (1983). The proportion by weight of the fillers whose size is less than 40 µm may also be measured by means of screen analysis. The aspect ratio is the ratio of particle diameter to thickness (greatest dimension to least dimension).

Particularly preferred particulate fillers are talc, kaolin, such as calcined kaolin, and wollastonite, and mixtures of two or all of these fillers. Among these, particular preference is given to talc with a proportion of at least 95% by weight of particles of diameter less than 40 µm, and with an aspect ratio of from 1.5 to 25, determined in each case on the finished product. Kaolin preferably has a proportion of at least 95% by weight of particles of diameter less than 20 µm, and with an aspect ratio of from 1.2 to 20, determined in each case on the finished product.

Component E

The molding compositions of the invention may comprise, as component E, additives known to the skilled worker, such as processing aids, pigments, stabilizers, flame retardants, rubbers, or mixtures of various additives. Examples of other conventional additives are oxidation retarders, agents to counteract decomposition by heat or decomposition by ultraviolet light, lubricants, dyes, and plasticizers.

According to the inventions, their proportion is from 0 to 40% by weight, preferably from 0 to 20% by weight, in particular from 0 to 15% by weight, based on the total weight of components A to E.

The molding compositions of the invention may be prepared by processes known per se. For example, a first step may mix component B and, where appropriate, C, D, and/or E with as yet still at least partially unreacted components a1), and, where appropriate, a2), and/or a3), and a second step may completely harden components a1) and, where appropriate, a2), and/or a3). The sequence of mixing components a1) and, where appropriate, a2), and/or a3) with components B and, where appropriate, C, D, and/or E may be varied, and therefore two or, where appropriate, three or more components may be premixed, or else all of the components may be mixed together.

To prepare the molding compositions of the invention, the epoxy compound a1) may preferably first be mixed with component B and, where appropriate, C, D, and/or E, and pre-reacted, where appropriate using initially only a portion of the entire amount of epoxy compound a1) to be used. This pre-reaction is preferably carried out at from 80 to 140° C. and generally takes from 30 to 360 min, but may also take 24 h, for example. The hardener a2) and/or the accelerator a3) and, where appropriate, the remainder of the epoxy compound a1) may then be added and the hardening reaction initiated. This reaction may proceed at from 100 to 240° C., for example.

Compared with the known epoxy resin systems modified with polyarylene ether sulfones, the molding compositions of the invention have improved transparency with comparably good or improved mechanical properties, such as comparably good or improved impact strength.

The molding compositions of the invention are suitable for producing moldings.

EXAMPLE

Test Methods

The viscosity number (VN [ml/g]) of the polyarylene ether sulfones was determined in 1% strength by weight N-methylpyrrolidone solution at 25° C.

The content of anhydride end groups in the polyarylene ether sulfones [% by weight, based on the weight of component B] was determined by quantitative IR absorption spectroscopy. For this, use was made of a calibration curve which had been determined on mixtures made from phthalic anhydride and component C, with defined makeup. In each case, the peak height of the absorption at 1770 $cm^{-1}$ was used. 10% strength by weight solutions of each specimen to be tested in dimethylformamide were used in measurement cells with a layer thickness of 76 µm, using calcium fluoride windows.

The content of carboxy groups deriving from 4,4'-bis (hydroxyphenyl)valeric acid in the polyarylene ether sulfones [% by weight, based on the weight of component B] was determined by $^1$H NMR. Details of this method are described by I. W. Parsons et. al. in Polymer 34, 2836 (1993).

The notch impact strength ($a_k$ [kJ/$m^2$]) of the molding compositions was determined to EN ISO 180 using a pendulum impact tester from the company Frank. The notch had a depth of 2 mm and a radius of 2.5 mm. The specimen dimensions were 80 mm×10 mm×2 mm.

The transparency of the molding compositions was assessed visually.

Preparation of Molding Compositions

Component a1)

The epoxy compound a1-1 used was bisphenol A diglycidyl ether with an average molar mass of 395 g/mol.

Component a2)

The hardener a2-1 used was hexahydrophthalic anhydride.

Component a3)

The accelerator a3-1 used was 2-ethyl-4-methylimidazole.

Component B

Component B1 was prepared by nucleophilic aromatic polycondensation, as follows:

262.76 g of dichlorodiphenyl sulfone and 228.28 g of bisphenol A were dissolved in 1000 ml of N-methylpyrrolidone under nitrogen, and treated with 140.97 g of anhydrous potassium carbonate. With continuous distillative removal of the water formed in the reaction and N-methylpyrrolidone, the reaction mixture was first heated to 180° C. for 1 h and then further reacted for 7 h at 190° C. After this time, 26.58 g of 4-fluorophthalic anhydride and 9.3 g of KF were added to the mixture and the reaction was continued for 15 minutes at 190° C. The solution was then cooled to 130° C. and filtered after adding 1000 ml of N-methylpyrrolidone, and then the polymer was isolated by precipitation in water.

After 3 extractions with water, the polymer was dried in vacuo at 160° C. The content of phthalic anhydride end groups in the polyarylene ether sulfone B1 was 2.3% by weight, and the viscosity number was 22.2 ml/g.

Component B2 was prepared by nucleophilic aromatic polycondensation, as follows:

287.08 g of dichlorodiphenyl sulfone and 210.02 g of bisphenol A, and 22.91 g of 4,4'-bis(hydroxyphenyl)valeric acid were dissolved in 1 of N-methylpyrrolidone under nitrogen, and treated with 141.00 g of anhydrous potassium carbonate. With continuous distillative removal of the water formed in the reaction and N-methylpyrrolidone, the reaction mixture was first heated to 190° C. and then further reacted for 7 h at 190° C. The solution is then diluted with 1 of N-methylpyrrolidone and cooled to 120° C. The cooled solution is filtered, and the polymer is isolated by precipitation in water. After 3 extractions with water, the polymer was dried in vacuo at 160° C. The content of units deriving from 4,4'-bis(hydroxyphenyl)valeric acid in the polyarylene ether sulfone B2 was 4.3% by weight, and the viscosity number was 18.6 ml/g.

As component B3 (for comparison), use was made of a polyarylene ether sulfone composed of units I2, with a viscosity number of 29.2 ml/g, measured in 1% strength NMP solution at 25° C., and with 0.24% by weight content of OH end groups, based on the total weight of B3.

Component C

The polyarylene ether sulfone C1 used was a polyarylene ether sulfone composed of repeat units I2 and with a viscosity number of 21 ml/g, measured in 1% strength NMP solution at 25° C. The content of C1 end groups was 99.8 mol %, based on the entirety of the end groups.

To prepare the molding compositions, 120 g of the epoxy compound a1-1 and 100 g of the hardener a2-1 were mixed at 80° C. until the distribution was homogeneous. The desired amounts of each of the components B1, B2, B3, C1, D, and/or E were then admixed at 180° C. 2.4 g of the accelerator a3-1 were then added at about 40° C., with vigorous stirring. The bubbles produced during stirring were removed by evacuating the reaction vessel for five minutes. Each of the mixtures was hardened immediately after its preparation for a period of 24 h at 80° C. and post-cured for a further period of 30 min at 200° C.

The makeup of the resultant molding compositions and the results of the tests are listed in Table 1.

TABLE 1

| | Molding composition | | | | | | | | | |
|---|---|---|---|---|---|---|---|---|---|---|
| | 1 | 2 | 3 | 4 | V1 | V2 | V3 | V4 | V5 | 5 |
| Makeup [% by weight]: | | | | | | | | | | |
| A* | 90 | 85 | 80 | 75 | 90 | 85 | 80 | 75 | 90 | 90 |
| B1 | 10 | 15 | 20 | 25 | — | — | — | — | — | — |
| B2 | — | — | — | — | — | — | — | — | — | 10 |
| B3 | — | — | — | — | — | — | — | — | 10 | — |
| C1 | — | — | — | — | 10 | 15 | 20 | 25 | — | — |
| Properties: | | | | | | | | | | |
| $a_k$ [kJ/m²] | 0.69 | 0.59 | 0.74 | 0.95 | 0.43 | 0.12 | 0.04 | 0.05 | 0.78 | 0.91 |
| Transparency | yes | yes | yes | yes | no | no | no | no | no | yes |

The molding compositions prefixed by V are given for comparison.
*The weight of component A is defined as the total of the weights of components a1-1, a2-1 and a3-1.

The experiments demonstrate that, when compared with the known epoxy resin systems modified with polyarylene ether sulfones, the molding compositions of the invention have improved transparency, with comparably good or improved impact strength.

We claim:

1. A molding composition comprising
   A) from 40 to 99% by weight of at least one epoxy resin obtained from one or more at least bifunctional epoxy compounds,
   B) from 1 to 60% by weight of at least one polyarylene ether sulfone containing side-groups selected from the group consisting of carboxy groups,
   C) from 0 to 60% by weight of at least one polyarylene ether sulfone containing essentially no side or end groups selected from the group consisting of carboxy and anhydride groups,
   D) from 0 to 60% by weight of at least one filler, and
   E) from 0 to 40% by weight of one or more various additives,
   where the percentages by weight of components A to E together give 100%.

2. A molding composition as claimed in claim 1, wherein the molding composition is a thermosetting molding composition, in which the epoxy resin A is obtained from
   a1) one or more at least bifunctional epoxy compounds, and in addition thereto from the optional components
   a2) one or more hardeners, and/or
   a3) one or more accelerators.

3. A molding composition as claimed in claim 1, in which the polyarylene ether sulfones B comprise
   from 0 to 100 mol % of repeat units I1

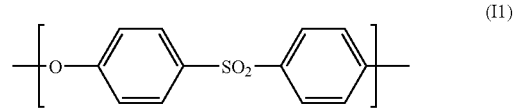
(I1)

and
from 0 to 100 mol % of repeat units I2

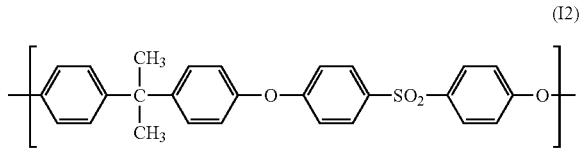
(I2)

where the molar percentages of repeat units of the formulae I1 and I2 together give 100 mol %, and where the units I1 and I2 also contain, based on the total weight of component B, from 0.1 to 15% by weight of sidegroups selected from the group consisting of carboxy groups.

4. A molding composition as claimed in claim 1, in which the polyarylene ether sulfones C comprise
from 0 to 100 mol % of repeat units I1, and
from 0 to 100 mol % of repeat units I2,
where the molar percentages of repeat units of the formulae I1 and I2 together give 100 mol %.

5. A process for preparing molding compositions as claimed in claim 1, which comprises, in a first step, mixing component B and optionally C, D, and/or E with one or more as yet still at least partially unreacted at least bifunctional epoxy compound (a1) and optionally one or more hardeners (a2) and/or one or more accelerators (a3), and, in a second step, completely hardening the epoxy compound(s) (a1) and, where present, the hardener(s) (a2) and/or the accelerator(s) (a3).

6. A method for molding which comprises molding the composition as claimed in claim 1.

7. A molding obtained from the molding compositions as claimed in claim 1.

8. A molding composition as claimed in claim 1, in which the epoxy resin A is obtained from a1) one or more at least bifunctional epoxy compounds, and in addition thereto components a2) one or more hardeners.

9. A molding composition as claimed in claim 1, in which the epoxy resin A is obtained from a1) one or more at least bifunctional epoxy compounds, selected from the group consisting of bisphenol A diglycidyl ether, bisphenol F diglycidyl ether, resorcinol diglycidyl ether, triglycidyl ethers of para-aminophenols.

* * * * *